US012461549B2

(12) United States Patent
Sicard

(10) Patent No.: US 12,461,549 B2
(45) Date of Patent: Nov. 4, 2025

(54) BANDGAP REFERENCE CIRCUIT

(71) Applicant: NXP USA, Inc., Austin, TX (US)

(72) Inventor: Thierry Michel Alain Sicard, Auzeville Tolosane (FR)

(73) Assignee: NXP USA, Inc., Austin, TX (US)

( * ) Notice: Subject to any disclaimer, the term of this patent is extended or adjusted under 35 U.S.C. 154(b) by 541 days.

(21) Appl. No.: 17/937,686

(22) Filed: Oct. 3, 2022

(65) Prior Publication Data

US 2023/0152837 A1 May 18, 2023

(30) Foreign Application Priority Data

Nov. 15, 2021 (EP) .................................... 21306583

(51) Int. Cl.
*G05F 3/30* (2006.01)

(52) U.S. Cl.
CPC .................................... *G05F 3/30* (2013.01)

(58) Field of Classification Search
CPC ........... G05F 3/26; G05F 3/30; H10D 10/058; H10D 62/133–136
See application file for complete search history.

(56) References Cited

U.S. PATENT DOCUMENTS

| | | | | |
|---|---|---|---|---|
| 4,249,122 A | 2/1981 | Widlar | | |
| 6,121,824 A * | 9/2000 | Opris | G05F 3/30 | 327/539 |
| 6,700,226 B2 | 3/2004 | Vendrame et al. | | |
| 7,772,920 B1 * | 8/2010 | Anderson | G05F 3/30 | 327/539 |
| 8,508,211 B1 * | 8/2013 | Anderson | G05F 3/30 | 327/539 |
| 2006/0250178 A1 * | 11/2006 | Gierkink | G05F 3/30 | 327/539 |
| 2014/0015504 A1 * | 1/2014 | Sano | G05F 3/267 | 323/282 |
| 2015/0228643 A1 * | 8/2015 | Song | H10D 62/115 | 257/526 |

(Continued)

FOREIGN PATENT DOCUMENTS

| | | | |
|---|---|---|---|
| DE | 102015101549 A1 * | 8/2015 | H01L 23/562 |
| EP | 4009132 A1 | 6/2022 | |

OTHER PUBLICATIONS

Machine translation of DE 102015101549 A1. (Year: 2015).*

*Primary Examiner* — Fred E Finch, III

(57) ABSTRACT

A bandgap voltage reference circuit comprises a plurality of delta base-emitter voltage (ΔVbe) cells extending between first and second voltage rails in a serial arrangement. Each ΔVbe cell includes a transistor comprising a single first emitter connection and eight second emitter connections. The single first emitter connection of a second transistor in the serial arrangement is coupled to one of the eight second emitter connections of a first transistor in the serial arrangement, and one of the eight second emitter connections of the second transistor is coupled to the single first emitter connection of a third transistor in the serial arrangement to form an electrical path from the first transistor to the third transistor. A resistor is at a distal end of the serial arrangement. An output voltage across the resistor includes a sum of delta base-emitter voltages generated by the plurality of ΔVbe cells.

19 Claims, 7 Drawing Sheets

(56) References Cited

U.S. PATENT DOCUMENTS

2017/0177017 A1* 6/2017 Horng ........................ G05F 3/16
2020/0301462 A1* 9/2020 Sicard ...................... G05F 3/265
2021/0172807 A1 6/2021 Bucur

* cited by examiner

BANDGAP REFERENCE CIRCUIT

CROSS-REFERENCE TO RELATED APPLICATIONS

This application claims the priority under 35 U.S.C. § 119 of European Patent application no. 21306583.2, filed on 15 Nov. 2021, the contents of which are incorporated by reference herein.

FIELD

The present disclosure relates generally to a reference circuit, and more specifically, to a bandgap reference circuit having a multi-NPN transistor configuration having a smallest possible surface area that reduces the delta mechanical stress on a delta base-to-emitter voltage (ΔVbe) cell of the circuit and produces a highly accurate bandgap voltage.

BACKGROUND

Bandgap reference voltage circuits are widely used in integrated circuits where a fixed reference voltage is required that does not change with variations in power supply voltage, temperature and other factors. Accordingly, reference generators are implemented in a wide range of electronic applications that require accurate signal processing and voltage reference circuits.

Mechanical stress in reference voltage circuits formed in conventional plastic packaging can cause temperature drift, or lifetime drift, due to aging and packaging-induced inaccuracies in bandgap voltage references. This stress shows local variations over the chip area and causes changes and drift in the base-emitter voltages of bipolar transistors and consequently in the output voltage of bandgap references.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Embodiments of the present inventive concept addresses the foregoing by providing a semiconductor device having a bandgap reference voltage circuit that reduces the mechanical stress on the reference voltage by including a multi-emitter transistor as part of a $\Sigma\Delta V_{be}$ circuit that accommodates a smallest possible surface area. $\Delta V_{be}$ is a difference between base-emitter voltages of the differential pair of transistors, the output voltage Vbg of a bandgap reference voltage circuit is derived from a sum of ΔVbe values from a plurality of cascaded multi-emitter transistors, the number of which may vary depending on the reference voltage required and the value of ΔVbe in each transistor.

Figure 2:
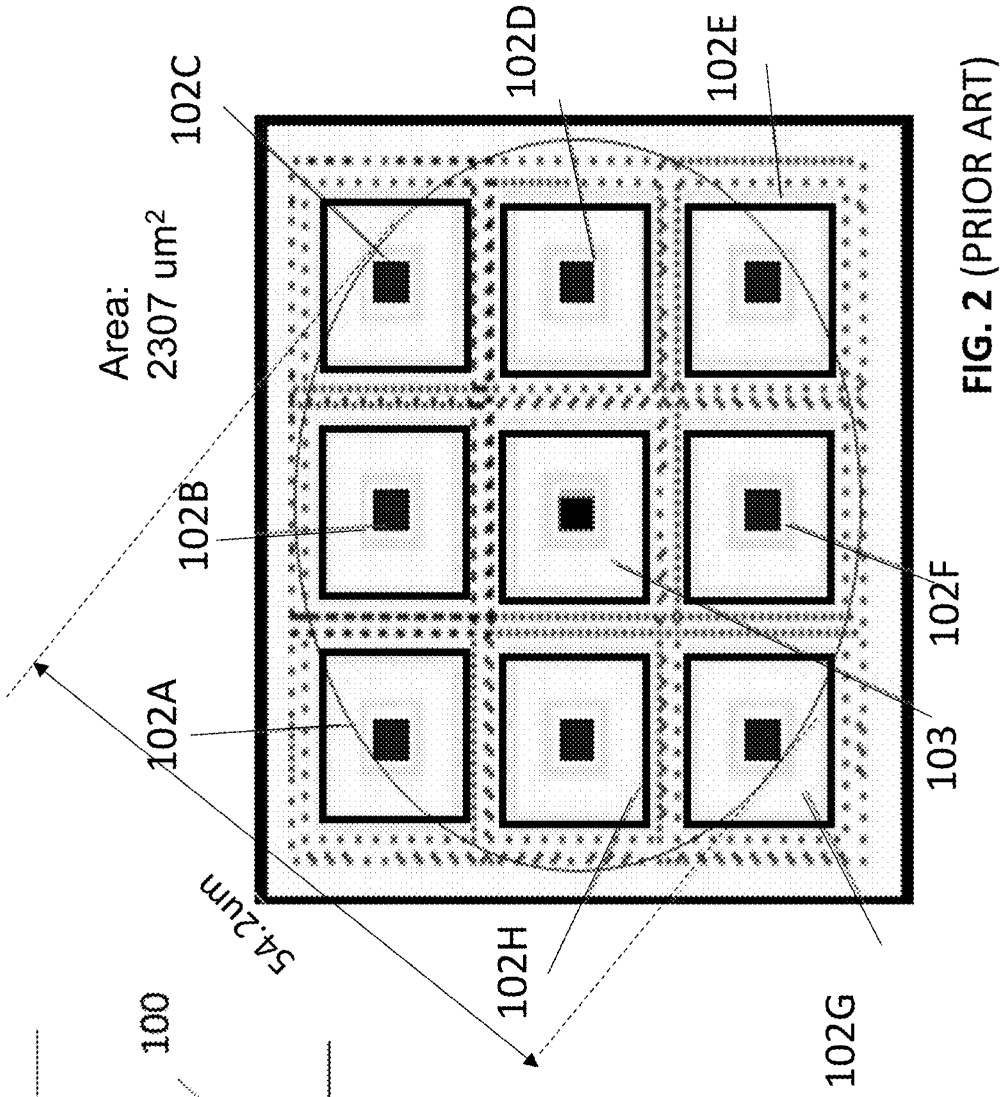
FIG. 2 (PRIOR ART)
FIG. 2 is an illustration of a layout of a surface area of the reference circuit of FIG. 1.
Figure 1:
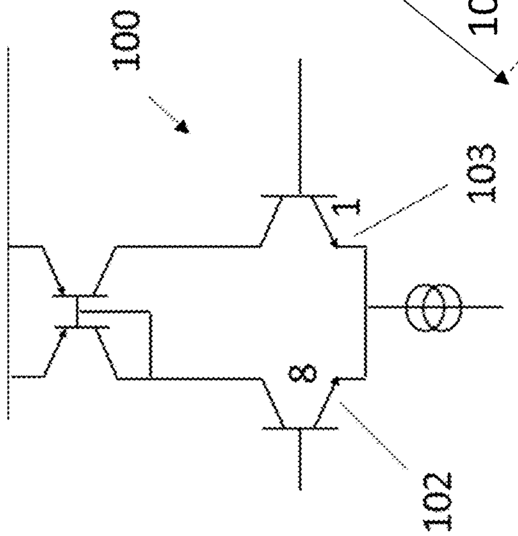
FIG. 1 (PRIOR ART)
FIG. 1 is a schematic representation of a conventional reference circuit.

As shown in FIGS. 1 and 2, a conventional ΔVbe circuit 100 uses nine (9) distinct and separate NPN transistors 102A-102F, 103, i.e., each having its own base, emitter, and collector. The transistors can be arranged in a 3×3 array, where eight (8) of the NPN transistors 102A-102F (generally, 102), referred to as first transistors, are connected in parallel, forming an 8:1 ratio with respect to the second transistor 103 or configured as a 1 and 8 emitter area. Here, the same current is applied to the connector branches of the first transistors 102. Under mechanical plastic package stress, each Vbe junction may experience lifetime drift. For example, a maximum distance between emitters of 54.2 μm, so that the 3×3 array of this conventional 8:1 ΔVbe circuit has an area of 2307 $\mu m^2$.

Figure 4:
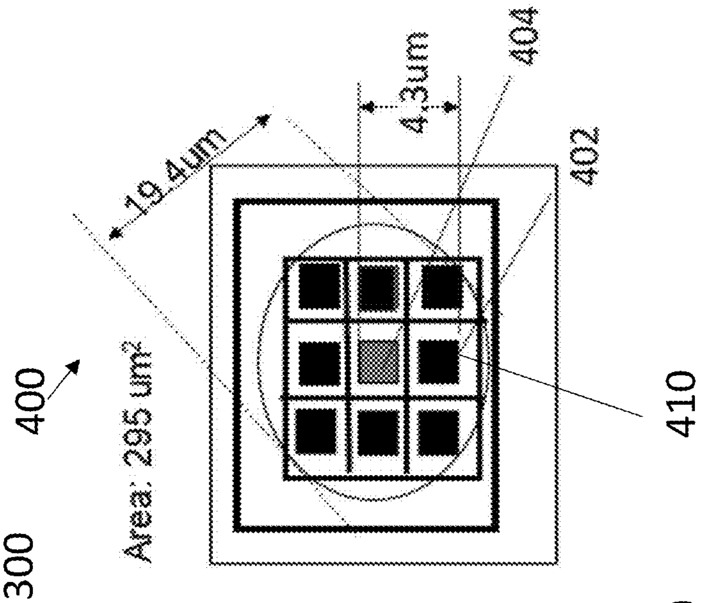
FIG. 4 is an illustration of a layout of a surface of a ΔVbe cell of the semiconductor device of FIG. 3, in accordance with an embodiment.

However, the maximum distance between emitters of a ΔVbe cell 400 shown in FIG. 4 in some embodiments is 19.4 μm, whereby the ΔVbe cell 400 has an area of 295 $\mu m^2$, or 7.8 times less the area than the ΔVbe circuit shown in FIG. 2, or range for example between 250-350 $\mu m^2$. In some embodiments, the distance from the center emitter 404 and each of the eight peripheral emitters 402 can be 4.3 μm, or a range between 4.0-5.0 μm. The smaller area compared to that of a conventional circuit increases the possibility of achieving equal local mechanical stress over the smaller area, e.g., 250-350 $\mu m^2$, which increases the possibility of the circuit achieving a desired lifetime ΔVbe value of 0 or other minimum value. Also, the diagonal distance between the center emitter 404 and the center of the angle emitter 402 can be divided by 2.6. If over this small distance the gradient of the equal stress line is linear, then the circuit 300 can have three times less stress than the conventional circuit 100 and three times less lifetime drift.

Figure 3:
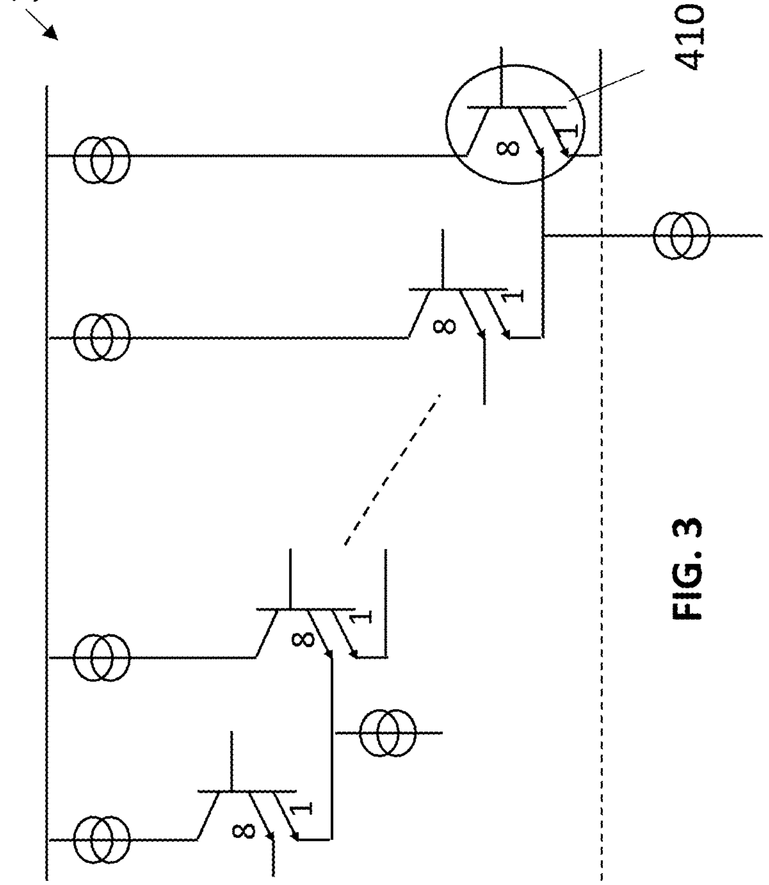
FIG. 3 is a schematic representation of a semiconductor device having a ΔVbe circuit including a plurality of multi-emitter type transistors, in accordance with an embodiment.

More specifically, to achieve this minimum lifetime drift with respect to the ΔVbe value due to mechanical package stress, the 8:1 transmitter emitter ratio occupy a minimum surface area, which in turn achieves a minimum delta stress between each emitter. The solution is to apply the topology illustrated in FIGS. 3-4, where the 9 emitters of a single NPN transistor 400 is constructed and arranged so that 8 emitters are positioned about 1 emitter. The transistor 400 can have a single base and collector, and nine (9) emitters, including a first emitter 511, referred to as an emitter eight and a second emitter 512, referred to as an emitter one As shown in FIG. 3, this topology is applied to form a ΣΔVbe circuit 300. The circuit 300 includes a stack of multi-emitter transistors 410. Each transistor 410 is part of a ΔVbe cell 400 shown in FIG. 4. The transistors 410 can be bipolar NPN transistors, but not limited thereto. In some embodiments, the transmitters 410 of the ΔVbe cells are only, or exclusively, NPN transistors. Each transistor 410 can have nine (9) emitters sharing a common base and collector. Here, the emitters are constructed and arranged to have an 8:1 ratio comprising a plurality of first emitters 402, also referred to as an emitter eight configuration positioned about a single central emitter 404, referred to as a second emitter 404, or emitter one configuration. As described above, the maximum distance between two of the first emitters 402 is 19.4 μm but not limited thereto. The area occupied by the 9 emitters of ΔVbe cell 400 is 295 $\mu m^2$ but not limited thereto. In some embodiments, the area can range between 250 and 350 $\mu m^2$.

Figure 5:
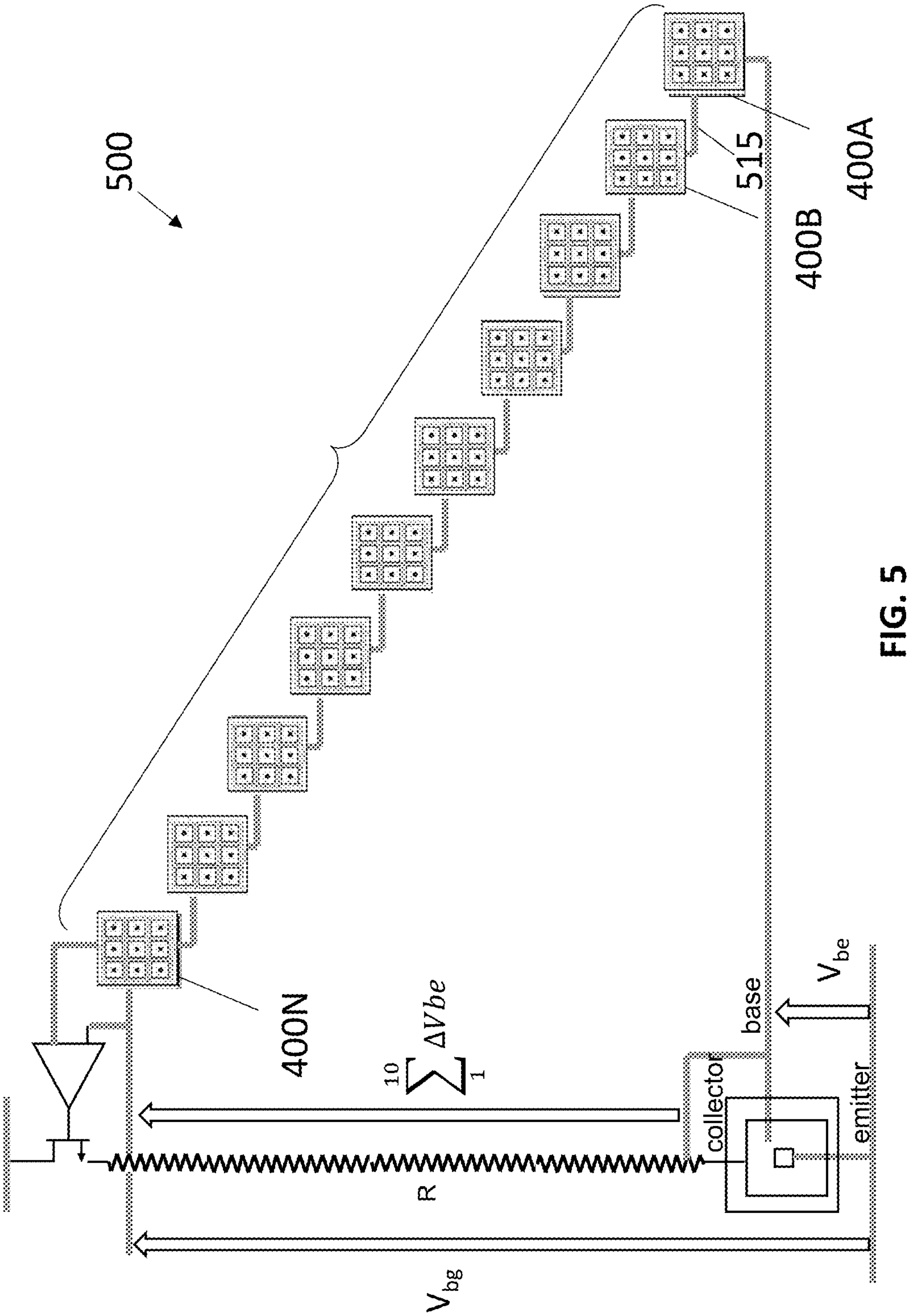
FIG. 5 is a layout schematic view of a ΔVbe circuit having a plurality of daisy-chained ΔVbe cells, in accordance with an embodiment.

FIG. 5 is a layout schematic view of a ΔVbe circuit 500 having a plurality of daisy-chained ΔVbe cells 400 of FIG. 4, in accordance with an embodiment. In preferred embodiments, the emitter one of ΔVbe cell, e.g., ΔVbe cell 400A, can be coupled to an emitter eight of a neighboring ΔVbe cell, e.g., ΔVbe cell 400B such that all cells 400A-400N (e.g., N=10) in the ΔVbe circuit 500 are electrically connected in a daisy-chain configuration (shown by electrical path 515). However, the cells 400 can have different emitter sizes (1 and 8) attached in series, as shown. In particular, cell 400A has an emitter size 8 (611) coupled to an emitter size 1 (612) of cell 400B. Accordingly, each emitter from one cell 400 is attached with a neighboring cell 400.

Figure 6:
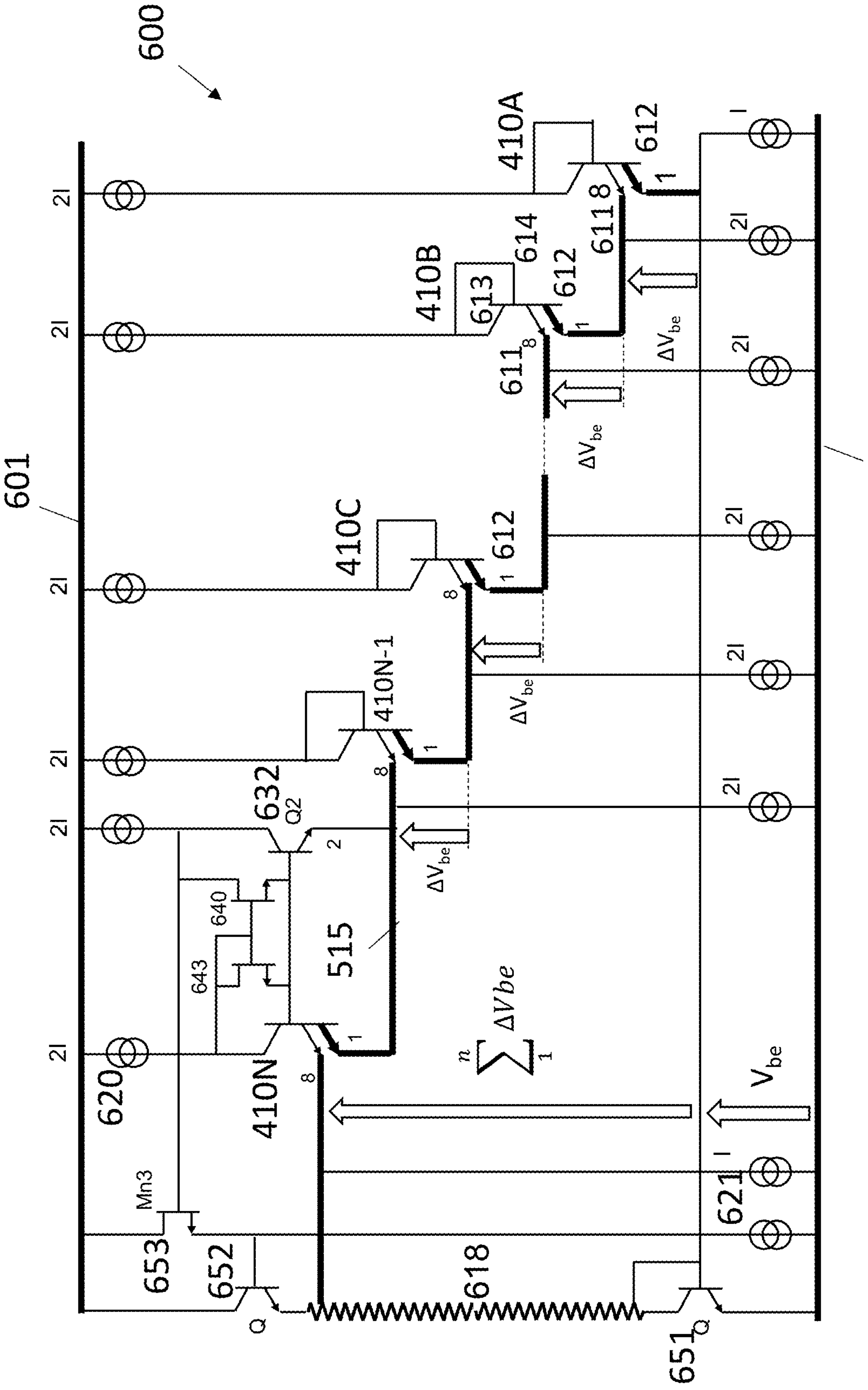
FIG. 6 is a schematic circuit diagram of the ΔVbe circuit of FIG. 5 constructed and arranged as a bandgap reference voltage circuit, in accordance with an embodiment.

FIG. 6 is a schematic circuit diagram of the ΔVbe circuit 500 of FIG. 5 constructed and arranged as a bandgap reference circuit 600, in particular, a bandgap reference voltage circuit.

The collection of common emitters (size 1 (611) and size 8 (612)) are supplied with a current source 620. The transistors 410A-410N (generally, 410) are connected similar to back to back diodes, where the collector 613 and base 614 can be shorted. A first current source 620 can be coupled to the collector 613 and a second current source 621 can be coupled to the emitter one 611 of each multi-emitter transistor 410. Accordingly, in the bandgap reference voltage circuit 600 of FIG. 6, the top and bottom currents (I) are equal or almost equal.

The chain of transistors 410 extending between voltage rails 601, 602 results in the bandgap reference voltage Vbg being the sum of the base-emitter voltage $V_{be}$ of the transistors 410 due to the emitter one 611 of each coupled to an emitter eight 612 of a next transistor 410 in the chain. The bandgap reference voltage Vbg, or output voltage of the bandgap reference voltage circuit, is a sum of the Vbe voltage from the ground (see FIGS. 5-8) and the ΔVbe values of each multi-emitter transistor 410, where ΔVbe is the difference between the voltage (Vbe1) of the emitter one 611 and the voltage (Vbe8) of the emitter eight 612 of each of the 10 cells 400.

The last, or distalmost, ΔVbe cell (400N) in the chain, where N is 10 in this example, has the same configuration as the first ΔVbe cell (410A), with the addition of NPN transistor 632 connected to the base of the last multi-emitter transistor 410N. The collector of the last multi-emitter transistor 410N drives an arrangement of NMOS transistors 640, 643, 653, which can control the base current of the output NPN bipolar transistor 652. With this topology, the bandgap value is exclusively a sum and difference of the NPN Vbe from the NPN bipolar transistor 651 to the top of a main resistor 618. In some embodiments, the bandgap voltage value (e.g., shown in FIGS. 5-7) is the base voltage (Vbe) between the bottom voltage rail from the NPN bipolar transistor 651 coupled to the main resistor 618 added to the sum of the voltages of the ΔVbe cells 400. In some embodiments, the sum of the ten (10) ΔVbe cells is equal to at or about 600 mV at room temperature. This voltage is applied to the sensor contact of the main resistor 618 with insignificant or no current, or just the base current. The top and bottom resistor contacts of the resistor 618 multiplied by the resistor current forms a voltage drop, which can move or change if the contact(s) move or change during lifetime and/or due to mechanical stress. However, the voltage drop is not included in the bandgap voltage equation because the bandgap value is the Vbe from ground to the bottom sense contact of the main resistor 618 in addition to the ΣΔVbe connected with the top sense contact of the resistor 618.

Figure 7:
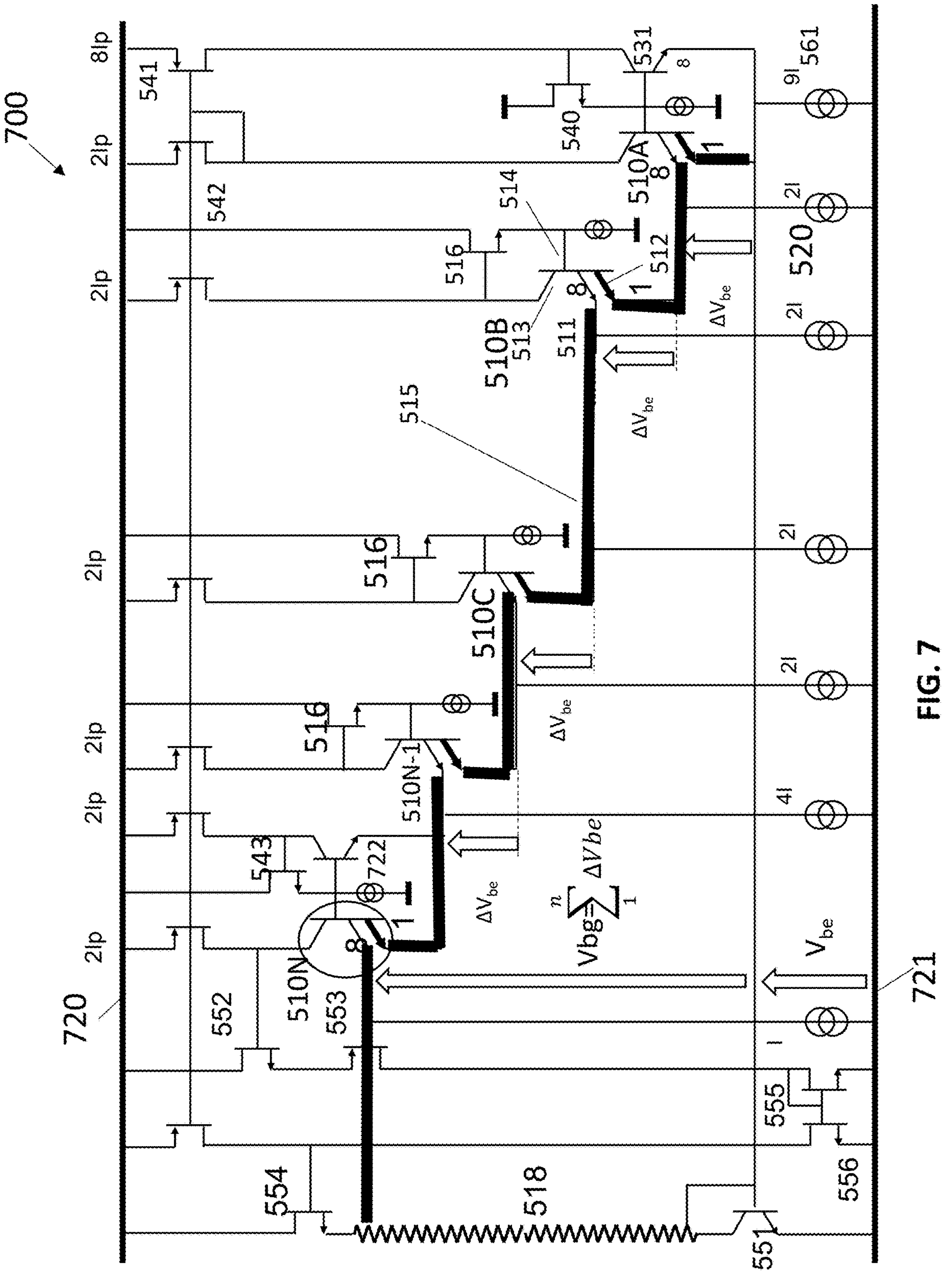
FIG. 7 is a schematic circuit diagram of a bandgap reference voltage circuit, in accordance with another embodiment.

FIG. 7 is a schematic circuit diagram of a bandgap reference voltage circuit 700, in accordance with another embodiment. Elements of the bandgap reference voltage circuit 700 are similar to or the same as those described in FIGS. 4-6. Details of these similar or same elements are not repeated for brevity.

One difference between the bandgap reference voltage circuit 600 of FIG. 6 and the bandgap reference voltage circuit 700 of FIG. 7 is that the bandgap reference voltage circuit 600 of FIG. 6 describes a top source 620 and bottom source 621 being equal with respect to a current source. The base current is taken directly on the collector. Therefore, the last stage, or output stage including the last multi-emitter transmitter 410N in the chain, includes the NMOS transistors 640, 643 configured to collect the base current Ib from the collector to re-inject into the base of the final stage transmitter 410N, and to ensure that the top and bottom currents are equal.

The bandgap reference voltage circuit 700 on the other hand includes two different current sources 720, 721. The top current source 720 produces a current (Ip) and the bottom current source 721 produces a current (I), the difference being provided by a current source 722 providing a current (Ib) to the base of the multi-emitter transistors 410. Here, a multi-emitter transistor 510A of the first ΔVbe cell connected to the bandgap voltage Vbe has a base that is coupled to a NPN transistor 531. The emitter of the NPN transistor 531 can be connected in diode with an NMOS transistor 540, which has a gate coupled to a collector of the NPN transistor 531, a source coupled to a connector between the bases of the NPN transistors 531, 510A and the top current source 720 controlled by a PMOS transistor 541, and a drain coupled to a ground. A current loop formed by the NPN transistor 531 and the NMOS transistor 540 drives the current (Ip) of the top current source 720. The external bias current drives the bottom current (emitter current) so that the top current (Ip) can be equal to the bottom current (I) minus the base current (Ib) formed by the base current source 722 and a follower NMOS transistor 516 coupled between the top current source 720 and the base of the multi-emitter transistor 510. Accordingly, the base current (Ib) is taken directly on the collector.

As shown in the circuit 700 of FIG. 7, the emitter current supplied by the current sources 520 is equal to the other NPN collectors. A bias is formed at current sources 541 (8I) and 561 (9I), because Vbe of the NPN transistor 531 is in parallel with the 1 emitter of the multi emitter of the circuit 520A. The 2I bias provided by current source 520 is to bias one I in the emitter cell 1 and one I in the emitter cell 8 of the circuit.

To achieve the same voltage (Vbe) between the multi-emitter circuit 520A of the NPN transistor 531, the same current density is set, which means on current I by the one emitter and current 8I for the eight emitters because the NPN transistor 531 has 8 emitters. Accordingly, the sink current is 9I, i.e., current 8I from the eight emitter NPN transistor 531 and one current I for the single emitter.

In doing so, the multi-emitter transistor 510A of the first ΔVbe cell connected to the bandgap voltage Vbe has a base that is coupled to a NPN transistor 531. The emitter of the NPN transistor 521 is parallel with the emitter size 1 of the ΔVbe cell 510A and is connected in diode with an NMOS transistor 540, which has a gate coupled to a collector of the NPN transistor 531, a source coupled to a connector between the bases of the BJTs 531, 510A and a current source 541, and a drain coupled to a ground.

A current mirror can be formed of the NMOS transistor 540 and the NPN transistor 531 and the emitter size one of the first ΔVbe cell 510A. Here, the collector current of the first ΔVbe cell 510A is copied by the PMOS transistors 541 and 542 to the NPN mirror input, i.e., the NMOS transistor 540 and the NPN transistor 531. The collector current of the first ΔVbe cell 510A is copied in the other ΔVbe cells 510. The bases of the other ΔVbe cells 510 are supplied through a follower NMOS transistor 516, except for the first ΔVbe cell 510A controlled by the NMOS transistor 540 with the assistance of NPN transistor 531 and the last ΔVbe cell 510N controlled by the NMOS transistor 543 with assistance from NPN transistor 532.

Another feature pertains to the buffer supplying a main resistor bandgap voltage. As shown and described, the stack of the N ΔVbe cells, where N=10 in this example, begins from the PN junction of a BJT component arrangement 551 connected to ground extending to the top of the resistor 518 defining the current in the BJT 551 by equation (Eq.) 1: ΣΔVbe/R (118).

The last ΔVbe cell (510N), where N is an integer, for example, 10 in the chain has the same configuration as the first ΔVbe cell (510A), with the addition of NPN transistor 532 connected to NMOS transistor 543. The collector of the last ΔVbe cell (510N) drives an NMOS transistor 552 and PMOS transistor 553 to the control the gate current of the output NMOS transistor 554 through a mirror formed of NMOS transistors 555, 556. With this topology, the bandgap value is exclusively a sum and difference of the NPN Vbe from the transistor 551 to the top of the main resistor 518. In some embodiments, the sum of the ten (10) ΔVbe cells can be equal to at or about 600 mV at room temperature. This voltage is applied to the sensor contact of the main resistor 518 with insignificant or no current, or just the base current. The current is output to the resistor 518 via the source connector of the output NMOS transistor 554 and is output via the collector of the transistor 551. The top and bottom resistor contacts of the resistor 518 multiplied by the resistor current forms a voltage drop, which can move or change if the contact(s) move or change during lifetime and/or due to mechanical stress. However, the voltage drop is not included in the bandgap voltage equation because the bandgap value is the Vbe from ground to the bottom sense contact of the main resistor 518 in addition to the ΣΔVbe connected with the top sense contact of the resistor 518.

Figure 8:
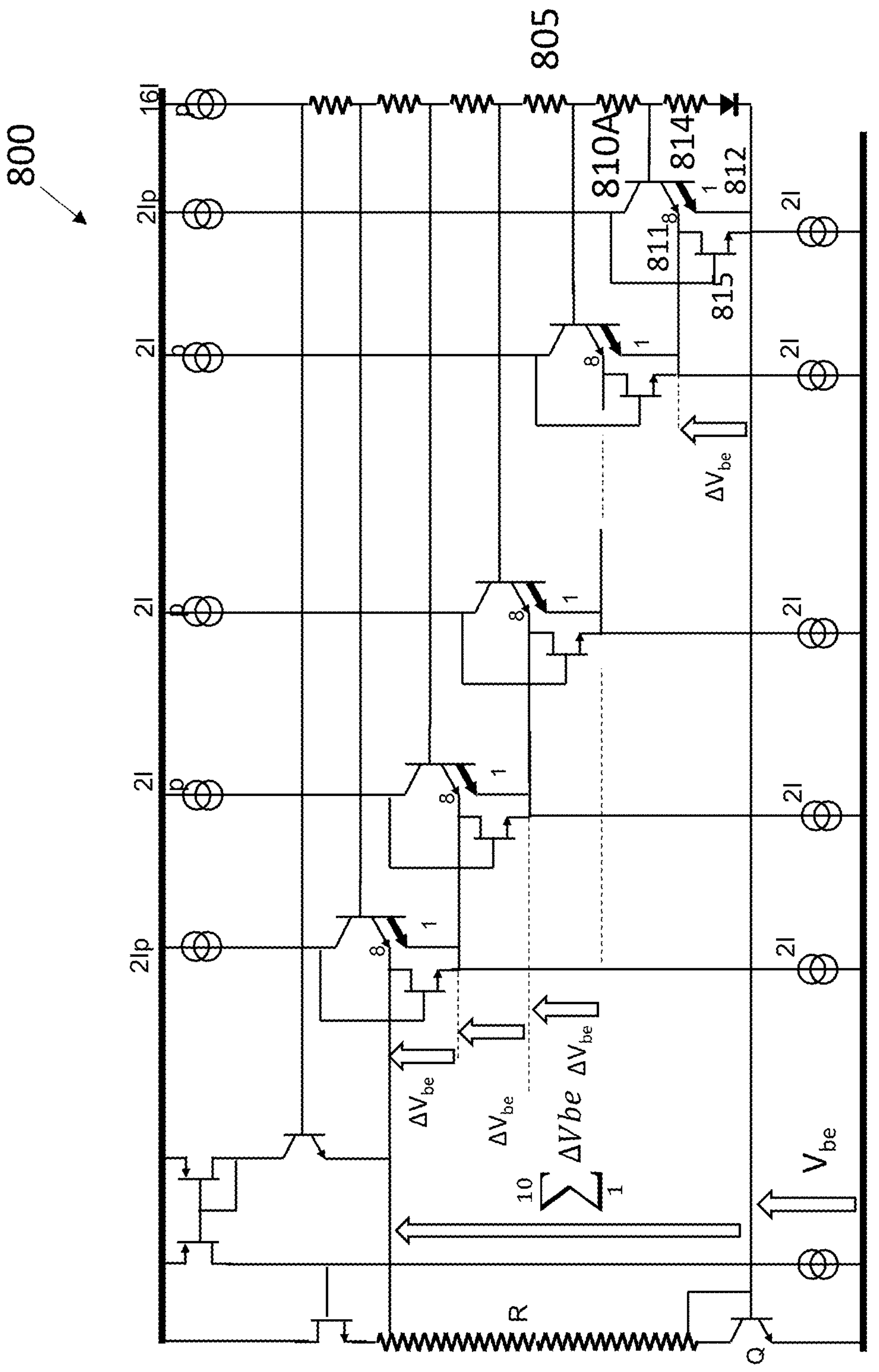
FIG. 8 is a schematic circuit diagram of a bandgap reference voltage circuit, in accordance with another embodiment.

FIG. 8 is a schematic circuit diagram of a bandgap reference voltage circuit 800, in accordance with another embodiment. Elements of the bandgap reference voltage circuit 700 are similar to or the same as those described in FIGS. 4-7. Details of these similar or same elements are not repeated for brevity.

In the bandgap reference voltage circuit 800, the base 814 of each multi-emitter transistor 810A-810N (generally, 810) is coupled to a resistor divider 805. An NMOS transistor 815 extends from the connection between the emitter eight 812 of the transistor, e.g., 810A, and the emitter one 811 of the neighboring multi-emitter transistor, e.g., 810B, in the chain to a current source coupled to ground. This topology can improve parameters pertaining to the bandgap voltage (Vbg) spread with respect to less standard deviation due to fabrication processes. Therefore, the bandgap value spread can be decreased as compared to other manufacturing processes.

Figure 9:
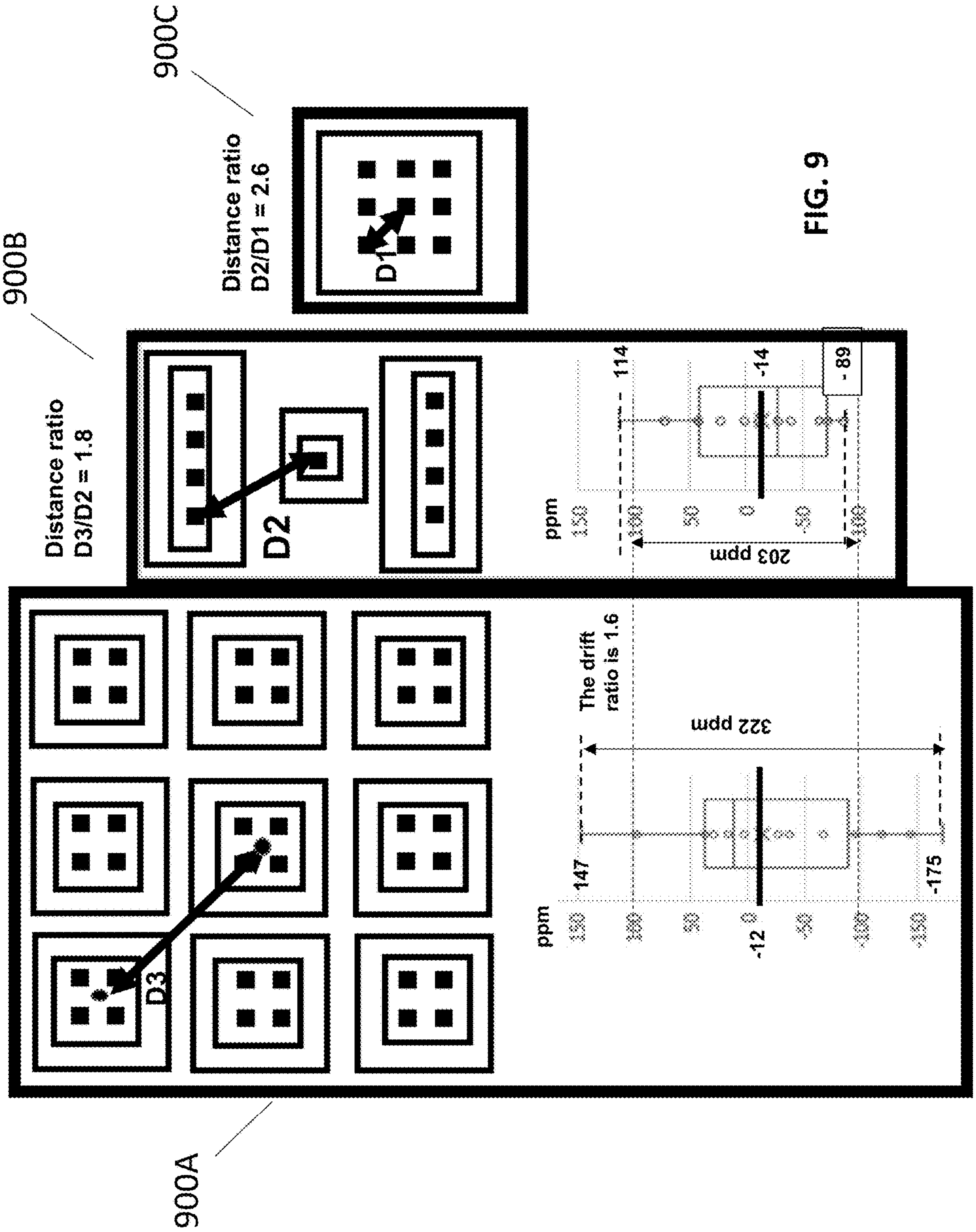
FIG. 9 is an illustration of comparative ΔVbe cell layouts, in accordance with another embodiment.

As described above, in some embodiments, the distance from the center emitter and the eight peripheral emitters of ΔVbe cell shown and described in FIG. 3-8 is 4.3 μm. As shown in FIG. 9, this is due to a reduced ratio, shown by ΔVbe cell 900C over other layouts, for example, ΔVbe cells 900A and 900B. For example, the bandgap drift shown at ΔVbe cell area 900A has a maximum-minimum value of 322 ppm. The distance ratio (D3/D2) between ΔVbe cell area 900A and ΔVbe cell area 900B is 1.8, where the ΔVbe cell area 900B has a reduced bandgap max.-min. drift value of 203 ppm. The lifetime drift of the ΔVbe cell 400 can be reduced by a factor of 1.6. However, the distance ratio (D2/D1) between ΔVbe cell area 900B and ΔVbe cell area 900C is 2.6 due at least in part to the distance (D1) of 4.3 μm between the center emitter 404 and a peripheral emitter 402, indicating that the preferable results are provided by the ΔVbe cell area and further minimum feasible ΔVbe results can be achieved by the cell 400.

Accordingly, FIG. 9 illustrates the measurable effect of minimizing the ΔVbe area, to minimize the delta mechanical stress between each emitter based on the area size. This feature is beneficial in many applications, such as battery management system (BMS) applications, which require high accuracy, e.g., at or around 0.05% requiring a trim operation. The reference voltage is required to remain between +/−0.1% during the circuit's lifetime by reducing parameter variation and the like. This can be achieved by reducing the delta mechanical stress by decreasing the ΔVbe cell area, which in turn reduces the bandgap lifetime drift of the circuit.

As mentioned above, the bandgap structure of the circuit consumes a minimum possible ΔVbe circuit region. In some embodiments, the ΔVbe voltage is at or about 60 mV, compared to 600 mV at the PN junction. Accordingly, the ΔVbe is 10 times more sensitive to Vbe variations. The ΔVbe circuit 400 described herein provides a difference between these Vbe values. If the Vbe variation is due to mechanical package stress, then both PN junctions must have the same stress, which can be achieved by the minimum silicon area consumed by the bandgap reference circuit.

As will be appreciated, embodiments as disclosed can include at least the following embodiments. In one embodiment, a bandgap voltage reference circuit can comprise a plurality of delta base-emitter voltage (ΔVbe) cells extending between first and second voltage rails in a serial arrangement. Each ΔVbe cell can include a transistor comprising a single first emitter connection and eight second emitter connections. The single first emitter connection of a second transistor in the serial arrangement can be coupled to one of the eight second emitter connections (611) of a first transistor in the serial arrangement, and one of the eight second emitter connections of the second transistor can be coupled to the single first emitter connection of a third transistor in the serial arrangement to form an electrical path from the first transistor to the third transistor. A resistor is at a distal end of the serial arrangement. An output voltage across the resistor includes a sum of delta base-emitter voltages generated by the plurality of ΔVbe cells.

Alternative embodiments of the bandgap voltage reference circuit can include one of the following features, or any combination thereof.

A ΔVbe cell of the plurality of ΔVbe cells can be constructed and arranged as a 3×3 array having the single first emitter connection at a center of the array surrounded by the eight second emitter connections, and wherein the single first emitter connection is of a different size or other configuration than the eight second emitter connections.

The 3×3 array of the ΔVbe cell can have an area of about 295 $\mu m^2$.

The single first emitter connection at the center of the array can be separated from a peripheral emitter of the eight (8) second emitter connections by a distance of about 4.3 μm.

The transistors of the plurality of ΔVbe cells can be NPN transistors and/or include only NPN transistors.

The bandgap voltage reference circuit can further comprise an NPN transistor having an emitter coupled to a portion of the electrical path between the base of a distal multi-emitter transmitter and an eight emitter of a prior emitter transmitter in the serial arrangement and a collector that drives an arrangement of NMOS transistors, which control a gate current of an output transistor of the bandgap voltage reference circuit.

The bandgap voltage reference circuit can further comprise a first current source coupled to a plurality of PMOS transistors each having a source coupled to a collector of a ΔVbe cell transistor and providing a first current; a second current source coupled to the electrical path and providing a second current; and a third current source for providing a current difference to the bases of the multi-emitter transistors.

The bandgap voltage reference circuit can further comprise a resistor divider coupled to the base of each transistor.

The output voltage Vbg can be determined by an equation $$V_{bg} = \sum_{1}^{n} \Delta V_{be}$$

where n is the number of $\Delta V_{be}$ cells.

The output voltage Vbg can be determined by an equation $$V_{bg} = V_{be1} + \sum_{1}^{n} \Delta V_{be}$$

where n is the number of $\Delta V_{be}$ cells.

In another embodiment, a battery management system can comprise a bandgap voltage reference circuit that can include a plurality of delta base-emitter voltage (ΔVbe) cells extending between first and second voltage rails in a serial arrangement, wherein each ΔVbe cell includes a transistor comprising: a single first emitter connection; and eight (8) second emitter connections; wherein the single first emitter connection of a second transistor in the serial arrangement can be coupled to one of the eight second emitter connections of a first transistor in the serial arrangement, and one of the eight second emitter connections of the second transistor can be coupled to the single first emitter connection of a third transistor in the serial arrangement to form an electrical path from the first transistor to the third transistor; and a resistor at a distal end of the serial arrangement, wherein an output voltage across the resistor can include a sum of delta base-emitter voltages generated by the plurality of ΔVbe cells.

Alternative embodiments of the battery management system can include one of the following features, or any combination thereof.

A ΔVbe cell of the plurality of ΔVbe cells can be constructed and arranged as a 3×3 array having the single first emitter connection at a center of the array surrounded by the eight (8) second emitter connections.

The 3×3 array of the ΔVbe cell can have an area of about 295 $\mu m^2$.

The single first emitter connection at the center of the array can be separated from a peripheral emitter of the eight (8) second emitter connections by a distance of about 4.3 μm.

The transistors of the plurality of ΔVbe cells can be NPN transistors, in particular NPN transistors exclusively.

The battery management system can further comprise an NPN transistor having an emitter coupled to a portion of the electrical path between the base of a distal multi-emitter transmitter and an eight emitter of a prior emitter transmitter in the serial arrangement and a collector that drives an arrangement of NMOS transistors, which control a gate current of an output transistor of the bandgap voltage reference circuit.

The battery management system can further comprise a first current source coupled to a plurality of PMOS transistors each having a source coupled to a collector of a ΔVbe cell transistor and providing a first current; a second current source coupled to the electrical path and providing a second current; and a third current source for providing a current difference to the bases of the multi-emitter transistors.

The battery management system can further comprise a resistor divider coupled to the base of each transistor.

In another embodiment, a delta base-emitter voltage (ΔVbe) cell of a bandgap reference circuit can comprise a single first emitter connection; and eight (8) second emitter connections constructed and arranged as a 3×3 array having the single first emitter connection at a center of the array surrounded by the eight (8) second emitter connections, and wherein the single first emitter connection can be constructed and arranged to serially connect to a second emitter connection of a neighboring ΔVbe cell to form an electrical path with the neighboring ΔVbe cell.

Alternative embodiments of the ΔVbe cell can include one of the following features, or any combination thereof.

The ΔVbe cell can further comprise an NPN transistor that incorporates the first and second emitter connections.

The 3×3 array of the ΔVbe cell can have an area of about 295 $\mu m^2$ and the single first emitter connection at the center of the array can be separated from a peripheral emitter of the eight (8) second emitter connections by a distance of about 4.3 μm.

Although the invention is described herein with reference to specific embodiments, various modifications and changes can be made without departing from the scope of the present invention as set forth in the claims below. For example, although specific voltage levels, dimensions, and configurations have been shown and described in various embodiments of the ΔVbe cells, other suitable voltage levels, dimensions, and configurations can be used. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A bandgap voltage reference circuit, comprising:
a plurality of delta base-emitter voltage (ΔVbe) cells extending between first and second voltage rails in a serial arrangement, wherein each ΔVbe cell includes a transistor comprising:
a single first emitter connection; and
eight (8) second emitter connections;
wherein the single first emitter connection of a second transistor in the serial arrangement is coupled to one of the eight second emitter connections of a first transistor in the serial arrangement, and one of the eight second emitter connections of the second transistor is coupled to the single first emitter connection of a third transistor in the serial arrangement to form an electrical path from the first transistor to the third transistor; and
a resistor at a distal end of the serial arrangement, wherein an output voltage across the resistor includes a sum of delta base-emitter voltages generated by the plurality of ΔVbe cells.

2. The bandgap voltage reference circuit of claim 1, wherein a ΔVbe cell of the plurality of ΔVbe cells is constructed and arranged as a 3×3 array having the single first emitter connection at a center of the array surrounded by the eight second emitter connections, and wherein the single first emitter connection is of a different size or other configuration than the eight second emitter connections.

3. The bandgap voltage reference circuit of claim 2, wherein the 3×3 array of the ΔVbe cell has an area of about 295 $\mu m^2$.

4. The bandgap voltage reference circuit of claim 2, wherein the single first emitter connection at the center of the array is separated from a peripheral emitter of the eight (8) second emitter connections by a distance of about 4.3 μm.

5. The bandgap voltage reference circuit of claim 1, wherein the transistors of the plurality of ΔVbe cells include only NPN transistors.

6. The bandgap voltage reference circuit of claim 1, further comprising:
an NPN transistor having an emitter coupled to a portion of the electrical path between the single first emitter connection of a distal multi-emitter transistor and the eight emitter of a prior multi-emitter transistor in the serial arrangement; and
wherein a collector of the distal multi-emitter transistor drives an arrangement of NMOS transistors, which control a base current of an output transistor of the bandgap voltage reference circuit.

7. The bandgap voltage reference circuit of claim 1, further comprising:
a first current source coupled to a plurality of PMOS transistors each having a source coupled to a collector of a ΔVbe cell transistor and providing a first current;
a second current source coupled to the electrical path and providing a second current; and
a third current source for providing a current difference to the bases of the ΔVbe cell transistors.

8. The bandgap voltage reference circuit of claim 1, further comprising:
a resistor divider coupled to the base of each transistor.

9. The bandgap voltage reference circuit of claim 1, further comprising:
an additional ΔVbe cell transistor coupled between the plurality of ΔVbe cells and the second voltage rail, the additional ΔVbe cell transistor having a base-emitter voltage ($V_{be1}$); and
wherein the output voltage Vbg is determined by an equation:

$$V_{bg} = V_{be1} + \sum_{1}^{n} \Delta V_{be}$$

where n is the number of ΔVbe cells of the plurality of ΔVbe cells.

10. A battery management system, comprising:
a bandgap voltage reference circuit, comprising:
a plurality of delta base-emitter voltage (ΔVbe) cells extending between first and second voltage rails in a serial arrangement, wherein each ΔVbe cell includes a transistor comprising:
a single first emitter connection; and
eight (8) second emitter connections;
wherein the single first emitter connection of a second transistor in the serial arrangement is coupled to one of the eight second emitter connections of a first transistor in the serial arrangement, and one of the eight second emitter connections of the second transistor is coupled to the single first emitter connection of a third transistor in the serial arrangement to form an electrical path from the first transistor to the third transistor; and
a resistor at a distal end of the serial arrangement, wherein an output voltage across the resistor includes a sum of delta base-emitter voltages generated by the plurality of ΔVbe cells.

11. The battery management system of claim 10, wherein a ΔVbe cell of the plurality of ΔVbe cells is constructed and arranged as a 3×3 array having the single first emitter connection at a center of the array surrounded by the eight (8) second emitter connections.

12. The battery management system of claim 11, wherein the 3×3 array of the ΔVbe cell has an area of about 295 $\mu m^2$.

13. The battery management system of claim 11, wherein the single first emitter connection at the center of the array is separated from a peripheral emitter of the eight (8) second emitter connections by a distance of about 4.3 μm.

14. The battery management system of claim 10, wherein the transistors of the plurality of ΔVbe cells are exclusively NPN transistors.

15. The battery management system of claim 10, further comprising:
an NPN transistor having an emitter coupled to a portion of the electrical path between the single first emitter connection of a distal multi-emitter transistor and the eight emitter of a prior multi-emitter transistor in the serial arrangement; and
wherein a collector of the distal multi-emitter transistor drives an arrangement of NMOS transistors, which control a base current of an output transistor of the bandgap voltage reference circuit.

16. The battery management system of claim 10, further comprising:
a first current source coupled to a plurality of PMOS transistors each having a source coupled to a collector of a ΔVbe cell transistor and providing a first current;

a second current source coupled to the electrical path and providing a second current; and a third current source for providing a current difference to the bases of the ΔVbe cell transistors.

17. The battery management system of claim 10, further comprising:

a resistor divider coupled to the base of each transistor.

18. A delta base-emitter voltage (ΔVbe) cell of a bandgap reference circuit, comprising:

a single first emitter connection; and eight (8) second emitter connections constructed and arranged as a 3×3 array having the single first emitter connection at a center of the array surrounded by the eight (8) second emitter connections, and wherein the single first emitter connection is constructed and arranged to serially connect to a second emitter connection of a neighboring ΔVbe cell to form an electrical path with the neighboring ΔVbe cell; and wherein the 3×3 array of the ΔVbe cell has an area of about 295 $\mu m^2$ and the single first emitter connection at the center of the array is separated from a peripheral emitter of the eight (8) second emitter connections by a distance of about 4.3 μm.

19. The ΔVbe cell of claim 18, further comprising an NPN transistor that incorporates the first and second emitter connections.

* * * * *